United States Patent [19]

Schoute

[11] 4,398,289
[45] Aug. 9, 1983

[54] METHOD FOR THE TRANSMISSION OF DATA PACKETS

[75] Inventor: Frederik C. Schoute, Hilversum, Netherlands

[73] Assignee: U.S. Philips Corporation, New York, N.Y.

[21] Appl. No.: 235,171

[22] Filed: Feb. 17, 1981

[30] Foreign Application Priority Data

Feb. 15, 1980 [NL] Netherlands ......................... 8000941

[51] Int. Cl.$^3$ ............................................... H04J 3/02
[52] U.S. Cl. ...................................... 370/93; 370/95; 370/94
[58] Field of Search ........................ 370/17, 19, 60, 89, 370/90, 91, 95, 96, 94, 92, 93

[56] References Cited

U.S. PATENT DOCUMENTS 4,251,880  2/1981  Baugh et al. .......................... 370/94

Primary Examiner—Douglas W. Olms
Attorney, Agent, or Firm—James J. Cannon, Jr.

[57] ABSTRACT

Method for the transmission of data packets from a plurality of substations to a main station via a channel which they have in common, the main station transmitting a synchronizing signal which on reception in the substations indicates the beginning of a period which has been subdivided into a sequence of time slots of mutually equal lengths, those substations which have a data packet ready for transmission to the main station transmitting this packet to the main station in a time slot which was randomly selected from the said sequence of time slots, and the main station classifying the time slots as successful or mutilated depending on whether an unmutilated or a mutilated packet is received, in the main station the number of time slots of a next following period or frame being adapted on the basis of the detection of the number of successful and mutilated time slots and taking the conditional probabilities of the occurence of successful and mutilated time slots, given the number of substations transmitting in a time slot, into consideration.

2 Claims, 2 Drawing Figures

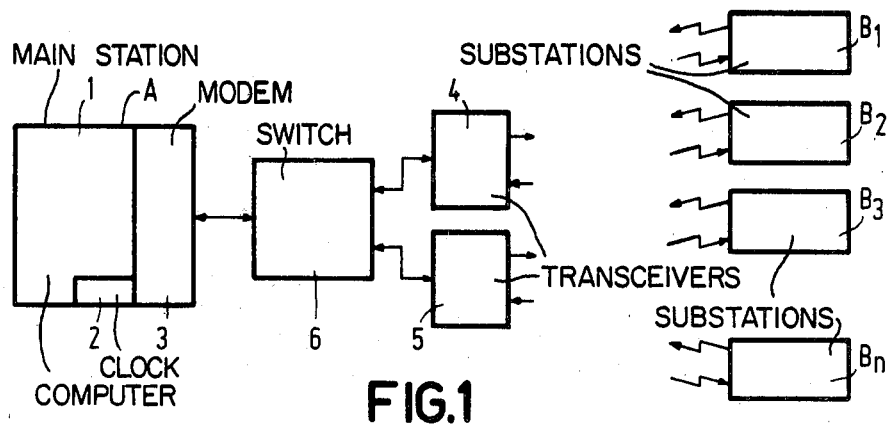
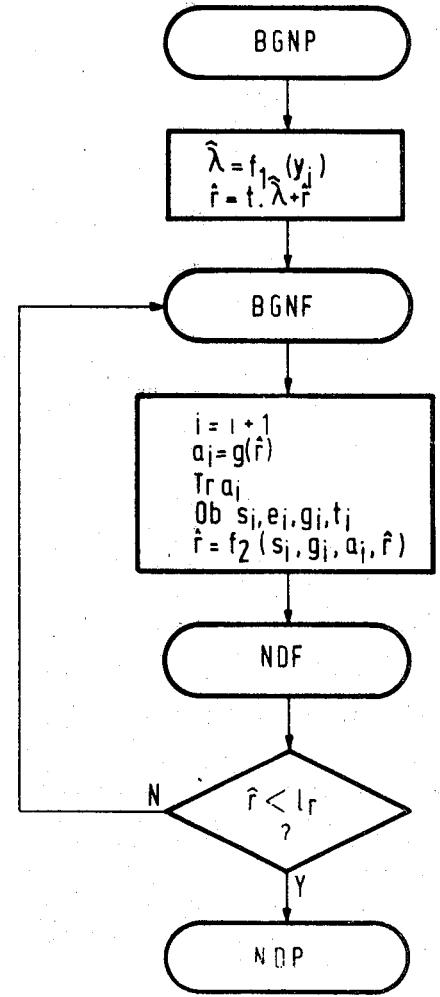
FIG.1
FIG.2

METHOD FOR THE TRANSMISSION OF DATA PACKETS

BACKGROUND OF THE INVENTION

1. Field of the Invention

The invention relates to a method for the transmission of data packets from a plurality of substations to a main station via a channel they have in common, the main station transmitting a synchronizing signal which indicates the beginning of a frame which is divided into a sequence of time slots of mutually equal lengths, those substations which have a data packet ready for transmission to the main station transmitting this packet to the main station in a time slot which is randomly selected from the sequence of time slots, the main station counting the time slots which are unmutilated, empty and mutilated respectively depending on whether an unmutilated, no packet or a mutilated packet is received.

2. Description of the Prior Art

The invention also relates to a system for using this method, which in the relevant literature is usually designated "slotted ALOHA", as may be apparent from the article of reference 1. This article also describes that this known "slotted ALOHA" strategy can be used successfully only when adequate measures are taken to prevent the system from becoming unstable when there is a large supply of traffic. More particularly, such an unstable condition occurs, when there is a large supply of traffic, when the transmission of data packets from the substations to the main station becomes inefficient because the number of packets which were transmitted mutilated increases, which means an increase in the number of packets to be retransmitted which, in turn, leads to a greater inefficiency and which ultimately results in a complete blockage of the system.

Several strategies, all based on extensive theoretical considerations, have already been proposed to solve this instability problem; in this connection reference is made to references 2 to 6, inclusive. Apart from the fact that in the majority of cases no direct implementation can be derived from these publications of the control measures proposed to solve said problem, these known strategies all have the drawback that they do not take into account differences in signals received by the substations and the central station.

SUMMARY OF THE INVENTION

It is an object of the invention to infer from the quality of a time slot (garbled, successful or empty) an estimate of the number of transmitting substations for any set of radio propagation conditions and to translate this estimate into a simple control action of the main station, which eliminates instability and which gives all mobiles equal chances of transmitting their request packets successfully and which allows throughput above the 1/e barrier of ordinary slotted ALOHA.

According to the invention, the method described in the opening paragraph is therefore characterized in that in the main station the number of time slots in the next frame is determined on the basis of the determination of the number of unmutilated, empty and mutilated time slots in the history of frames and that the number of time slots in a frame is transmitted as part of the synchronizing signal to said sub-stations.

When the method according to the invention is used, the number of time slots available for the substations is a function of the continuously up-dated estimate of the number of substations which have a data packet ready for transmission. This achieves that the number of time slots is adapted to the requirements. This dynamic A L O H A strategy renders the system stable and may in addition result in a greater efficiency, as the average number of time slots per period can be less than the fixed number of time slots per period required by the known "slotted A L O H A" strategy.

REFERENCES

1. Leonard Kleinrock and Simon S. Lam, "Packet Switching in a Multiaccess Broadcast Channel: Performance Evaluation", IEEE Transactions on Communications, Vol. COM-23, No. 4, April 1975, pp 410–423
2. Simon S. Lam and Leonard Kleinrock, "Packet Switching in a Multiaccess Broadcast Channel: Dynamic control Procedures", IEEE Transactions on Communications, Vol. COM-23, No. 9, September 1975, pp. 891–904.
3. G. Fayolle et al, "Stability and Control of Packet-switching Broadcast Channels", Int. Meeting on Mini-Com. and Data-Comm. Liege, Belgium, January 1975, pp. 211–216.
4. Hiromi Okada et Al, "Analysis and Application of Framed ALOHA Channel in Satellite Packet-Switching Networks—FADRA Method" Electronics and Communications in Japan, Vol. 60-B, No. 8, 1977 pp. 72–80.
5. Leonard Kleinrock and Y. Yemini, "An Optimal Adaptive Scheme for Multiple Access Broadcast Communication", Conference Record 1978, International Conference on Communications, Vol. 1, pp. 7.2.1.–7.2.5.

John I. Capetanakis, "Tree algorithms for packet broadcast channels" IEEE Transactions on Information Theory, Vol. IT-25, No. 5, September 1979.

BRIEF DESCRIPTION OF THE DRAWINGS

The invention and its advantages will now be further explained by way of example with reference to the accompanying drawing in which FIG. 1 shows a system for the transmission of data packets between a main station and several substations, and FIG. 2 is a flow chart of the computer functions performed in the main station to put the method according to the invention into effect.

DESCRIPTION OF THE PREFERRED EMBODIMENT

The system shown in FIG. 1 for the transmission of data packets comprises a main station A and a number of fixed or mobile substations $B_1, B_2, B_3, \ldots B_n$ scattered over a wide geographical area. The main station A comprises a central computer 1 having an associated clock circuit 2 and peripheral equipment in the form of a modem 3. The main station further comprises e.g. two transceivers 4, 5, which are connected to the central computer 1 via a network of matrix switches 6 and said modem 3. The substations $B_1, B_2, B_3, \ldots B_n$ are all of the same construction and each substation comprises a computer which is connected to a transceiver via peripheral equipment.

The system described so far is known and is used for the transmission of data packets which each contain one single message and which are all of the same length. More particularly, each packet is formed by a predetermined number of identification and check bits, a predetermined number of information bits and a predetermined number of parity bits. The parity bits in each packet are used for a cyclic error detection code. The system has the disposal of at least two channels for the radio transmission of data packets, namely a first channel for the transmission of data packets from the main station A to the substations $B_1$, $B_2$, $B_3$, ... $B_n$ and a second channel for the transmission of data packets from the substations $B_1$, $B_2$, $B_3$, ... $B_n$ to the main station A. These two radio transmission channels operate with the same bit rate. The transmission of data packets from the main station to the substations offers no difficulties, as the transmitter can be controlled and the use of a buffer store in the central computer of the main station renders it possible to transmit the data packets for the substations in a predetermined sequence, for example by means of a predetermined priority scheme, via the first channel. The transmission of data packets from the substations to the main station is, however, less simple as these data packets cannot be orderly arranged without further measures for contiguous transmission to the main station via the second channel. To this end, the system uses the known method according to which the main station transmits via the first channel a synchronizing signal which on reception in the substations indicates the beginning of a period which is divided in a sequence of time slots of mutually equal length, those substations which have a data packet ready for transmission to the main station transmitting this packet in a time slot which is randomly selected from said sequence of time slots and the main station classifying the time slots as successful or mutilated depending on whether an unmutilated or a mutilated packet is received.

A data packet transmitted by a substation may be received mutilated in the main station. This may be caused by two types of faults, namely:
(1) randomly occurring faults produced by noise, and
(2) faults caused by interference which may occur as the result of the fact that more than one substation select one and the same time slot simultaneously.

The second type of fault caused by interference will particularly occur when a large number of substations try to utilize the common transmission channel simultaneously. Interferences consequently limit the number of users of the common transmission channel and the efficiency of the system. As explained in detail in the foregoing and in reference 3 this loss in efficiency may easily result in system instability, that is to say in a total collapse of the transmission means.

According to the invention, this instability problem can be solved in a particularly elegant manner when, in the main station the number of time slots of a next period or frame is adapted on the basis of the detection of the number of successful, empty and mutilated time slots in the previous frame and taking the conditional probabilities of the occurence of successful, empty and mutilated time slots, given the number of substations transmitting in a time slot, into consideration.

The method according to the invention does not only prevent the system from coming into an unstable state when there is a large supply of traffic, but it furthermore results in a higher efficiency and an improved effectiveness since the number of time slots per period has been adapted to the estimated requirements.

The method according to the invention has furthermore the important advantage that it can be implemented in a simple manner.

In a preferred embodiment of the system according to the invention each period is subdivided into a plurality of consecutive frames and the adaptation of the number of time slots is realized by varying the number of time slots per frame and/or the number of frames per period.

In this embodiment the synchronizing signal transmitted by the main station indicated the beginning of each frame on reception in the substation. More particularly, the synchronizing signal comprises a numeric value in coded form, which indicates the number of time slots of the relevant frame. The number of time slots per frame and/or the number of frames per period is variable and is determined in the main station in dependence on the estimated requirements. This can be realized in a simple manner, as it is only necessary to process by means of the central computer 1, in accordance with a predetermined program, the information whether the packets received in the main station have been mutilated or not mutilated. The program produces an algorithm, the flow chart of which is shown in FIG. 2 and which is based on two levels of feedback information. On level 1, as a function of the detection of packets which are transmitted unmutilated and mutilated, an estimate is made of the extent to which the number of packets ready for transmission to the main station increases or decreases. This level 1-information defines the number of time slots of the first frame of the period. On level 2 the estimate of the number of packets ready for transmission to the main station is up-dated with the result of the preceding frame. The level 2-information determines the number of time slots of the following frame and whether a new frame must be added or not added to the relevant period.

The legends of the flow chart of FIG. 2 have the following meaning:

VARIABLES $\hat{\lambda}$: estimate of the increase per time unit of the number of substations which will have a packet ready for transmission.

$\hat{r}$: estimate of the number of packets ready for transmission to the main station.

t: time elapsed since the latest transfer period.

i: frame number.

$a_i$: number of time slots of frame i.

$t_i$: starting moment of frame i.

$s_i$: number of time slots in which an unmutilated packet is transmitted in frame i.

$e_i$: number of time slots in which no pacekt is transferred.

$g_i$: number of time slots in which a mutilated packet is transmitted in frame i.

$y_i$: $(t_1, s_1, g_1, t_2, s_2, g_2, \ldots t_i, s_i, g_i)$ frame history.

FUNCTIONS AND CONSTANTS $f_1$ estimate $\hat{\lambda}$ starting from $y_i$. This may be done, for example, as follows:

$$\hat{\lambda} = \sum_{j=0}^{99} s_{i-j}/(t_i - t_{i-100})$$

$f_2$ estimate $\hat{r}$ on the basis of $s_i$, $g_i$, $a_i$ and the previous value $\hat{r}$.
This may, for example, be done as follows $$\hat{r} = (g_i \cdot b_{gi}) + (e_i \cdot b_{ei}) + (s_i \cdot b_{si}) - s_i,$$

wherein
$b_{gi} = 1.81 + 0.56$ $\hat{r}/a_i$ represents the a posteriori expected value of the number of substations transmitting simultaneously in one slot, given that the time slot contains a garbled packet, wherein $b_{si} = 0.96 + 0.21$, $\hat{r}/a_i$ represents the a posteriori expected value of the number of substations transmitting simultaneously in one slot, given that the time slot contains an unmutilated packet, $b_{ei}$ represents the a posteriori expected value of the number of substations transmitting simultaneously in one slot, given that the time slot contains no packet, g determine the number of time slots in the next frame. This may, for example, be done as follows: $a_1 = \max(1, \text{int}(\hat{r}))$.

$l_r$ indicates the lowest limit value of r; no new frame is started below this value. This limit value may be, for example, $l_r = 0.5$.

TR (=transmit) $a_i$ an output function which transmits the number which defines the number of time slots $a_i$ of frame i as a portion of the synchronizing signal.

Ob (=observe) $s_i$, $e_i$, $g_i$ $t_i$ is an input function which derives from the history of frames the numbers $s_i$, $e_i$ and $g_i$ previously defined and which derives the starting moment $t_i$ of frame number i from the time clock.

It will be obvious that the invention is not limited to the embodiments described in the foregoing but that, depending on the use to which the system is put, an embodiment in which the transmission period is not divided into a number of consecutive frames is alternatively possible and that the fundamental feature of the invention must therefore be considered to be the adaptation of the number of time slots in each transmission period.

It should further be noted that in FIG. 2 the block BGNP denotes the beginning of a period, the blocks BGNF the beginning of a frame, the block NDF the end of a frame and NDP the end of a period.

THE ESTIMATION ALGORITHM

In the following $\hat{r}$ is replaced by $x^o$, $a_i$ by n, $s_i$ by $n_s$, $e_i$ by $n_e$, $g_i$ by $n_g$, $b_{gi}$ by $\hat{a}^o_g$, $b_{ei}$ by $\hat{a}^o_e$, $b_{si}$ by $\hat{a}^o_s$, and $\lambda$ by $\eta$. To remedy the instability it is essential to control the number of time slots per frame based on observations of the utilization of the time slots. Similarly the number of frames per period can be controlled, although this is less crucial.

In this section shall be analyzed how the probability distribution of the number of requests pending is updated given the number of successful time slots ($n_s$), garbled time slots ($n_g$) and empty time slots ($n_e$) in the frame under consideration. The number of time slots in the frame (n) is the sum of the three previous quantities.

Let the number of pending requests at the beginning of a frame, x, be Poisson distributed. Through randomization by the mobiles, the x requests are assigned with equal probabilities to one of the n time slots. The number of requests in each one of the n time slots, respectively $k_1, k_2, \ldots k_n$, are then independent, identically Poisson distributed random variables. The knowledge of the system (i.e., the central computer) about x is contained in the knowledge of the a priori distribution of $k_i$, which is, for $i = 1, 2, \ldots, n$:

$$Pr(k_i = k) = p(k) = e^{-\hat{a}} \cdot \frac{\hat{a}^k}{k!} \quad (1)$$

Note that this distribution is determined by one parameter, a, being the a priori expected value of $k_i$.

Consider one of the n time slots, say, slot i. Conditioned on the value of $k_i$ the system will observe a garbled slot with probability Pr (garbled $k_i$) or it will receive a successful request with probability Pr (success $k_i$) or else it observes an empty slot. For the qualitative analyses below the following will be chosen:

$$Pr(\text{garbled } k_i) = \begin{cases} 0 \text{ if } k_i = 0 \text{ or } 1 \\ 1 \text{ otherwise} \end{cases} \quad (2)$$

$$Pr(\text{success } k_i) = \begin{cases} 1 \text{ if } k_i = 1 \\ 0 \text{ otherwise} \end{cases}$$

$$Pr(\text{empty } k_i) = \begin{cases} 1 \text{ if } k_i = 0 \\ 0 \text{ otherwise} \end{cases}$$

The choice of numerical values in (2) corresponds to the simple case in which a packet comes through if and only if it is the only one in the time slot. It should be stressed that this choice is only for the benefit of exposition and comparison with other results. One can equally well assign a small positive value to Pr (garbled 0) and Pr (garbled 1) to include the effect of noise and positive values ato Pr (success 2), Pr (success 3), . . . to include the capture effect. Typically these values will be obtained from field measurements.

After observing the event of time slot i, where event = garbled, success or empty, the a Posteriori distribution of $k_i$ follows from the formula $$P^o_{ev}(k) = Pr(k_i = k | \text{event}) = \frac{Pr(\text{event}|k) \cdot p(k)}{\sum pr(\text{event}|j) \cdot p(j)} \quad (3)$$

The a posteriori expected value of $k_i$ is then $$\hat{a}^o_{ev} = k \cdot p^o_{ev}(k). \quad (4)$$

As will follow from the control law to be derived in the next section, the a priori expected number of requests per time slot, â, will be close to 1. For values of â in the neighborhood of 1, the expression for $\hat{a}^o_{ev}$ can very well be approximated by a linear form in â as follows:

$$\hat{a}^o_g = a_g + b_g \cdot \hat{a} \text{ if event} = \text{garbled} \quad (5)$$

$$\hat{a}^o_s = a_s + b_s \cdot \hat{a} \text{ if event} = \text{success}$$

$$\hat{a}^o_e = a_e + g_e \cdot \hat{a} \text{ if event} = \text{empty}$$

In this case with the event-probabilities as defined in (2) it can be calculated using (3), (4) and the first two terms of the McLaurin series at â = 1, that:

$$a_g = \frac{1}{(e-2)^2} = 1,94 \quad (6)$$

$$b_g = \frac{e^2 - 3 \cdot e + 1}{(e-2)^2} = 0,45$$

-continued $$a_s = a \text{ and } b_s = a_e = b_e = 0$$

Now, considering the whole frame again, the a posteriori expected value of x, $x^o$, is simply the sum of the $a^o_{ev}$'s of the n time slots. Defining $n_g$, $n_s$, $n_e$ respectively as the number of slots that have been observed as garbled, successful or empty, it is found, $$x^o = n_g \cdot a_g + n_s \cdot a_s + n_e \cdot a_e + (n_g \cdot b_g + n_s \cdot b_s + n_e \cdot b_e) \cdot \hat{a} - n_s \quad (7)$$

Note the last term of the expression above, ($n_s$), which has to be subtracted because the number of requests pending is reduced by $n_s$, the number of successful requests. Since $\hat{a}$ is just the a priori expected value of x divided by n, we have in (7) a simple expression for updating the expected value of the number of requests pending.

THE CONTROL ALGORITHM

The simple rule of thumb is to take the number of time slots in a frame equal to the expected number of pending request packets. More precisely:

$$n = \text{int}(E(x)) \quad (8)$$

Here $E(\ldots)$ stands for mathematical expectation and int$(\ldots)$ for rounding to the closest integer. The relation given in (8) will be called control law, because it prescribes how to control the number of time slots in a frame as a function of the expected number of pending requests. When x is Poisson with $E(x)=A$ and when the success probabilities are as given in (2), then the control law in (8) can be derived as follows.

Let x request packets be divided over n time slots, then the expected utilization (expected number of successful requests/n) is:

$$u(x) = \frac{x}{n} \cdot \left(1 - \frac{1}{n}\right)^{x-1} \quad (9)$$

The right hand side of (9) is just x times the probability of success for one packet divided by n. The average utilization, u, is obtained by calculating the expected value of u(x) with respect to the Poisson distribution:

$$u = E(u(x)) = \frac{A}{n} \cdot e^{-\frac{A}{n}} \quad (10)$$

From elementary calculus it follows that the function $v \cdot e^{-v}$ attains its maximum at $v=1$. Thus the utilization is maximized by $n=A$, or if A is not integer by properly taking one of the neighboring integers. For subsequent frames in the signalling period the same control law will be used as for the first frame. Thus the relation (8) prescribes how to control the frame-length as a function of updated knowledge.

THE DYNAMIC FRAME-LENGTH ALGORITHM

In the previous section it has been derived how after each frame the expectation of the number of pending requests is updated and how this determines the number of time slots in the next frame.

Two points still remain to be discussed: (a) how to determine the expected number of pending requests for the first frame, and (b) how to decide whether to start a new frame or to end the signalling period.

It is assumed that the arrival of new tasks forms a Poisson process for which the arrival rate, $\beta$ (requests/sec), varies only slowly in time. Therefore some simple scheme, such as averaging, may be used to estimate $\beta$. The system can keep track of how many seconds elapsed since the last signalling period, let this be T. The expected number of pending requests is then T. $\beta$ added to the expected number of pending requests left over from the previous period.

Also it is assumed that requests that arise during a signalling period will not be transmitted until the following signalling period.

Regarding the second point (b) it may be chosen to end the signalling period when the expected number of pending requests is smaller than 1. It appears that the throughput of the algorithm is rather insensitive to this choice.

TABLE 1

| The dynamic frame-length algorithm |
|---|
| DYNAMIC FRAME-LENGTH ALGORITHM |
| INITIAL PARAMETERS |
| $\beta$ = estimate of arrival intensity |
| T = time since last signalling period |
| x° = expected # pending requests |
| (left over from previous period) |
| BEGIN PERIOD |
| x° = $\beta \cdot$ T + x° |
| BEGIN FRAME |
| n = # Aloha slots = int(x°) |
| observe ~ g = · garbled slots |
| ~ s = # successful slots |
| ~ e = # empty slots |
| update x° according to (7) |
| END FRAME |
| if x° greater than 1 then NEXT FRAME |
| END PERIOD |

A simulation has been performed to analyse the performance of the algorithm. In the simulation $\beta$ and T have been taken constant and such that $\beta \cdot T=2$. As expected, no instability showed up in the simulation. The throughput is expressed as the fraction of time-slots that carries a successful packet. In the simulation of the algorithm we accumulated throughput separately for first frames, second frames, etc. In the results given in table 2, it can be seen that the throughput increases with the frame number. Note that the average throughput of 0.42 is well above $1/e$ ($\approx 0.37$).

TABLE 2

| Throughput of the dynamic frame-length algorithm | |
|---|---|
| FRAME NUMBER WITHOUT PERIOD | THROUGHPUT |
| 1 | .37 |
| 2 | .43 |
| 3 | .45 |
| 4 | .46 |
| OVERALL THROUGHPUT: | .42 |

What is claimed is:

1. An improved method for the transmission of data packets from a plurality of substations to a main station via a channel they have in common, the main station transmitting a synchronizing signal which indicates the beginning of a frame which is divided into a sequence of time slots of mutually equal lengths, those substations which have a data packet ready for transmission to the main station transmitting this packet to the main station in a time slot which is randomly selected from the sequence of time slots, the main station counting the time slots which are unmutilated, empty and mutilated respectively depending on whether an unmutilated, no packet or a mutilated packet is received, characterized in that said method further includes the steps of:
  determining in the main station the number of time slots in the next frame on the basis of the determination of the number of unmutilated, empty and mutilated time slots in the history of frames;
  taking into consideration the conditional probabilities of unmutilated, empty and mutilated time slots, given the number of substations;
  choosing said number of time slots in dependence on the a posteriori expected value in accordance with $$r = g_i \cdot b_{gi} + e_i \cdot b_{ei} + s_i \cdot b_{si} - s_i$$

where r represents the estimation of the number of packets ready for transmission to the main station, $g_i$ represents the number of time slots in which a mutilated packet has been transmitted in frame i, $e_i$ represents the number of time slots in which no packet is transferred, $s_i$ represents the number of time slots in which an unmutilated packet has been transmitted in frame i, $b_{gi}$ represents the a posteriori expected value of the number of substations transmitting simultaneously in one slot, given that the time slot contains a mutilated packet, $b_{ei}$ represents the a posteriori expected value of the number of substations transmitting simultaneously in one slot given that the time slot contains no packet and $b_{si}$ represents the a posteriori expected value of the number of substations transmitting simultaneously in one slot, given that the time slot contains an unmutilated packet; and that the number of time slots in a frame is transmitted as part of the synchronizing signal to said substations.

2. An improved method as claimed in claim 1, characterized in that said method further includes:
  grouping the frames in periods each comprising a string of frames; and
  controlling the substations to transmit in a period only if they have a packet ready at the beginning of that period.

* * * * *